United States Patent [19]

Phillips

[11] Patent Number: 4,877,270

[45] Date of Patent: Oct. 31, 1989

[54] CONNECTOR FOR TAPERED GLASS JOINTS

[76] Inventor: Edwin D. Phillips, 700 Cedar Ave., Middlesex, N.J. 08846

[21] Appl. No.: 246,735

[22] Filed: Sep. 20, 1988

[51] Int. Cl.⁴ .............................................. F16L 49/00
[52] U.S. Cl. ...................................... 285/18; 285/342; 285/334.3; 285/354; 285/387; 285/911
[58] Field of Search ...................... 285/911, 342, 334.3, 285/343, 388, 387, 354, 18

[56] References Cited

U.S. PATENT DOCUMENTS

| | | | |
|---|---|---|---|
| 1,750,790 | 3/1930 | Bessonett | 285/342 X |
| 2,294,160 | 8/1942 | Crane et al. | 285/911 X |
| 2,332,682 | 10/1943 | Yelinek | 285/342 |
| 2,374,348 | 4/1945 | Harding | 285/332 X |
| 3,305,249 | 2/1967 | Zahuranec | 285/354 X |
| 3,515,415 | 6/1970 | Clark et al. | 285/387 X |
| 3,544,281 | 12/1970 | Phillips | 285/334.3 X |
| 3,679,237 | 7/1972 | DeAngelis | 285/387 X |
| 4,296,950 | 10/1981 | Chamberlin | 285/342 X |
| 4,541,537 | 9/1985 | Sailor | 285/342 X |
| 4,582,444 | 4/1986 | Miskinis | 285/387 X |
| 4,669,763 | 6/1987 | Phillips | 285/911 X |

FOREIGN PATENT DOCUMENTS

| | | | |
|---|---|---|---|
| 237810 | 1/1960 | Australia | 285/354 |
| 1054294 | 4/1959 | Fed. Rep. of Germany | 285/911 |
| 891167 | 11/1943 | France | 285/334.3 |
| 252153 | 2/1964 | Netherlands | 285/911 |
| 2108227 | 5/1983 | United Kingdom | 285/911 |

Primary Examiner—Thomas F. Callaghan
Attorney, Agent, or Firm—Shoemaker and Mattare, Ltd.

[57] ABSTRACT

A connector for tapered glass joints includes a first glass tubing section having a tapered sealing surface on an inner end surface thereof and threads on an outer surface of said end. A second glass tubing section has an end adapted to be telescoped into the end of said first tubing section, and a replaceable, resilient sealing sleeve is adapted to be sealingly engaged concentrically between the outer end surface of the second tubing section and the inner end surface of the first tubing section. A threaded cap is adapted to be threaded onto said threads of said first tubing section to secure the parts together and to force the sealing sleeve into tight sealing engagement with the respective tubing surfaces. A retaining ring may be carried by said second tubing section for cooperation with said cap to prevent relative axial displacement between said tubing sections when the cap is tightened, and also to enable said cap to be used as a jack against said ring to separate said tubing sections when the cap is unscrewed. In another form of the invention, a split cap and clamping ring are used for larger tubing.

6 Claims, 3 Drawing Sheets

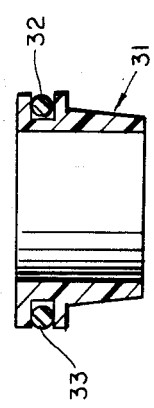
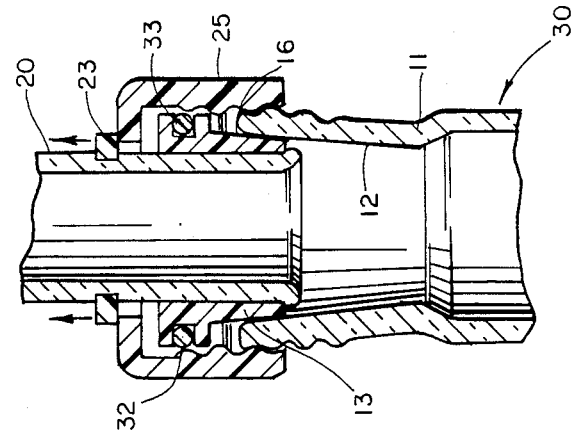
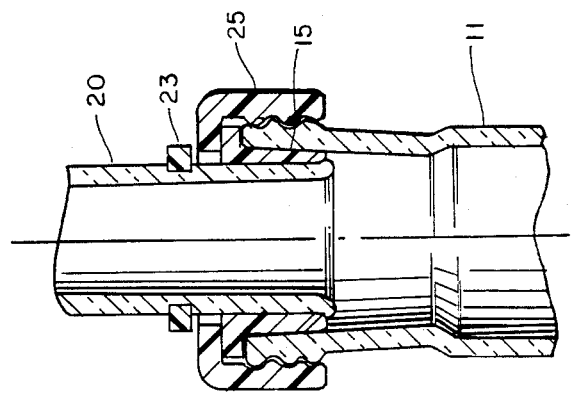
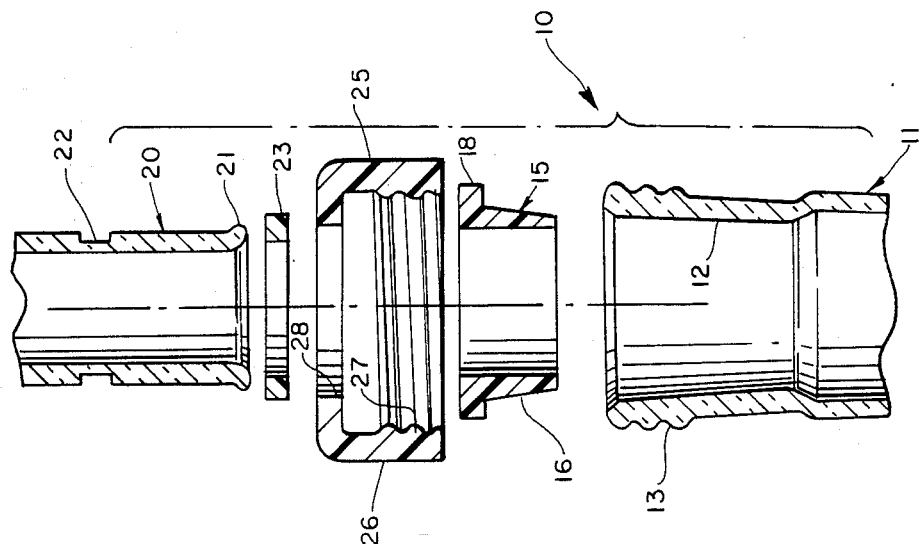

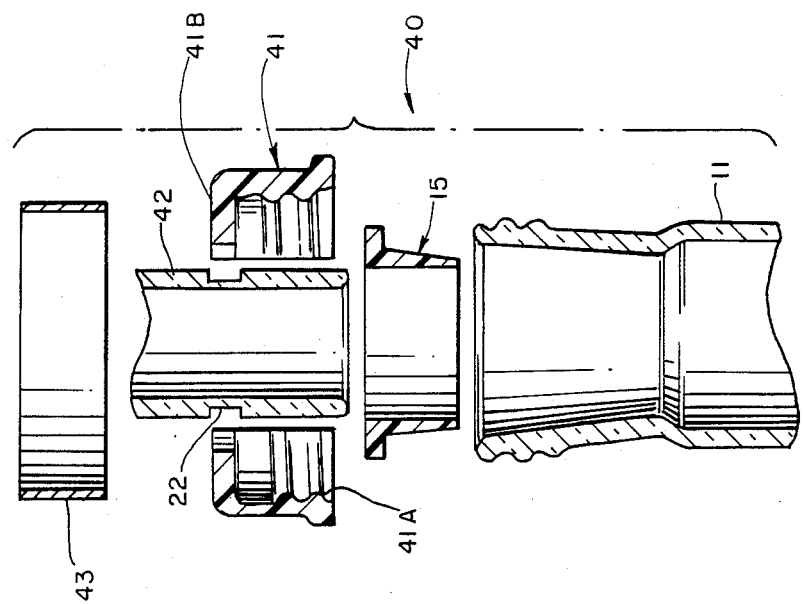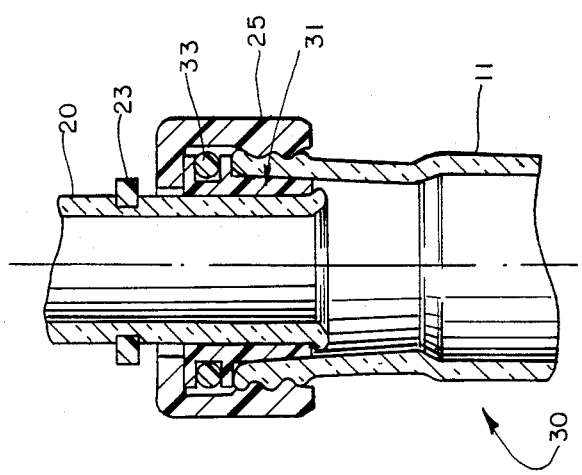

CONNECTOR FOR TAPERED GLASS JOINTS

FIELD OF THE INVENTION

This invention relates to connectors for joining sections of glass tubing, and more particularly, to such connectors for joining tapered glass joints in laboratory apparatus and the like.

PRIOR ART

In the chemical industry where glass apparatus is used, precision ground joints are widely used in connecting glass components together. This type of joint is convenient and efficient, but there are several problems in the manufacture and use of the joint. In many cases, grease must be used in the joint to effect a high vacuum or high pressure seal. The grease can contaminate the material being confined by the glass apparatus, and when the grease hardens over time the joint is very difficult to separate without breaking one or more of the components of the glass joint. Further, the manufacture of these joints is becoming very expensive due to the necessity of grinding both the male and female halves of the joint to produce the precision tolerances and finishes required to effect a seal. Such joints are primarily used in high vacuum processes. When they are used under high positive pressure conditions, expensive clips, springs, or other expensive devices must be used to hold the two halves of the joint together.

SUMMARY OF THE INVENTION

Accordingly, it is an object of this invention to provide a means for obtaining an effective seal of tapered glass joints without requiring precision grinding operations or the use of grease or other devices in making the joint.

Another object of the invention is to provide a simple and inexpensive means for connecting tapered glass joints capable of maintaining an effective seal under high vacuum or high positive pressure conditions.

A further object of the invention is to provide a simple and inexpensive means for connecting tapered glass joints and for easily separating the joint halves without breaking the components making up the joint.

BRIEF DESCRIPTION OF THE DRAWINGS

These and other objects and advantages of the invention will become apparent from the following detailed description when considered with the accompanying drawings, in which like reference characters designate like parts throughout the several views and wherein:

FIG. 1 is an exploded, longitudinal sectional view of the components of a first form of joint connection in accordance with the invention;

FIG. 2 is an assembled longitudinal sectional view of the joint connection of FIG. 1;

FIG. 3 is a longitudinal sectional view of a modified replaceable sleeve as used in a second form of joint connection in accordance with the invention;

FIG. 4 is a longitudinal sectional view of a second form of joint connection in accordance with the invention using the sleeve of FIG. 3, and showing how the cap and retaining ring may be used to "jack" the parts apart;

FIG. 5 is an assembled longitudinal sectional view of the components of the second form of joint connection in accordance with the invention;

FIG. 6 is an exploded, longitudinal sectional view of a third form of the invention, using a split nut and clamping ring;

DETAILED DESCRIPTION OF THE PREFERRED EMBODIMENTS

Figure 9:
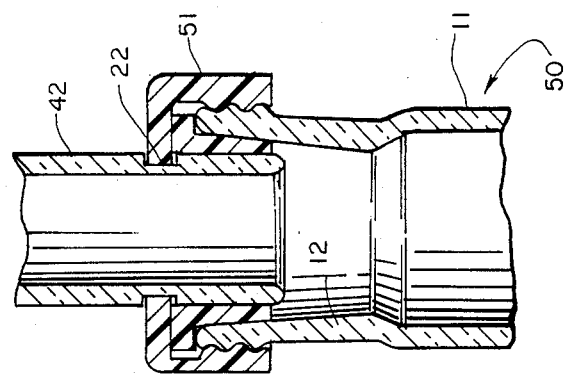
FIG. 9 is an assembled longitudinal sectional view of a fourth form of joint connection in accordance with the invention.

Referring more particularly to the drawings, a first form of joint connection in accordance with the invention is indicated generally at 10 in FIGS. 1 and 2. In this structure, a first section of glass tubing 11 has a standard unground taper 12 formed on the inner end surface and standard rounded bottle cap threads 13 formed on the outer end surface. The tapered surface 12 and threads 13 may be tooled at the same time and formed on the section of tubing in a conventional manner. If desired, the taper could be ground for use with a piece of old equipment which is not desirable to replace.

A replaceable sleeve 15 made of a suitable resilient material, such as Teflon, capable of resisting attack by the chemical or chemicals it is to be exposed to, has a tapered outer surface 16 adapted to mate to the shape of the taper 12 formed in the glass tubing, and a cylindrical inner surface 17. A radially outwardly directed flange 18 is formed on the end of the sleeve for engagement over the end of the section of tubing 11.

A second section of glass tubing 20 has an outwardly flared end 21 and an outer circumferential groove 22 spaced from the end. The groove may be ground or otherwise suitably formed in the tubing section.

A retaining ring 23 is adapted to be slipped over the end 21 of the tubing section 20 and received in the groove 22. The ring may be made of a resilient material which will enable it to be flexed over the end of the tubing and to then relax into the groove. Alternatively, the ring could be made of a material capable of being shrunk into the groove, or it could be a snap ring or the like.

A cap 25 having a depending skirt 26 with internal threads 27 therein is adapted to be threaded onto the threads 13 on the tubing section 11 for retaining the parts in assembled relationship as shown in FIG. 2 and for forcing the sleeve 15 into tight sealing relationship with the tapered surface 12 in the tubing section 11. The cap may be made of plastic or other suitable material and has an inner, annular end edge 28.

The replaceable sleeve 15, ring 23, tubing section 11 with flared end 21 and groove 22, and cap 25 replace the conventional precision ground male tapered section and associated parts as used in the prior art.

In use, the ring 23 is first slipped over the end of the tubing section 20 and permitted to relax into the groove 22. The cap 25 is then moved axially onto the end of the tubing section 20 into engagement with the ring 23, and the sleeve 15 is positioned over the flared end 21 and against the underside of the cap. The thus assembled components are then placed in operative relationship with the tubing section 11 and the cap 25 threaded tightly onto the threads 13 to force the sleeve tapered surface 16 into sealing engagement with the tapered surface 12 in the tubing section 11, clamping the flange 18 on the sleeve between the end of the tubing section and the underside of the cap, as shown in FIG. 2. The flared end 22 of the tubing section 20 prevents the tubing section from being displaced out of the connection due to internal pressure or mechanical force applied thereto. The ring 23 prevents the tubing section 20 from being displaced axially into the tubing section 11 by outside mechanical force or fluid pressure.

The replaceable ring 23 may be thrown away after use, rather than being cleaned for subsequent use. A further advantage of the joint connection thus described is that the sleeve prevents direct glass-to-glass contact between the components, thereby preventing chipping or breaking of the glass. The joint thus formed is capable of withstanding both high positive pressure and high vacuum, and does not require the use of any materials which might contaminate the product being controlled. Also, there is no need to use expensive manufacturing techniques, such as precision grinding, and/or clips and springs and the like to form the components of the joint connection and maintain a fluid-tight seal.

A second form of the invention is shown at 30 in FIGS. 3, 4 and 5. In this form of the invention, the replaceable sleeve 31 has an annular groove or channel 32 formed in the outer surface of the flange 18 and an o-ring 33 is received therein for effecting a seal as more fully described in applicant's earlier patent No. 4,669,763. In all other respects, this form of the invention is identical to that previously described and illustrated.

Moreover, as shown in FIG. 4, an additional advantage of the invention is the ability to use the cap 25 as a "jack" against the retaining ring 23 when the cap is unscrewed to force the joint components apart and prevent breakage thereof.

Figure 8:
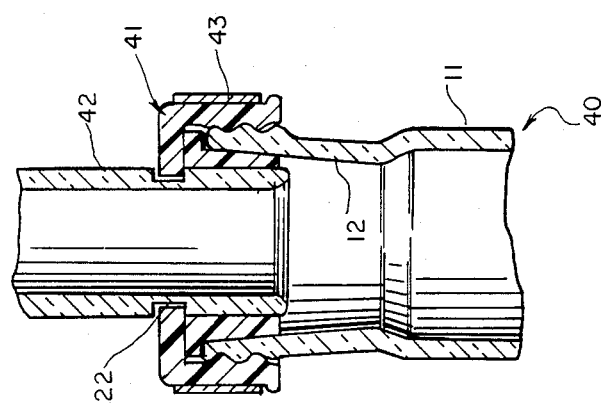
FIG. 8 is an assembled longitudinal sectional view of the third form of joint connection in accordance with the invention.
Figure 7:
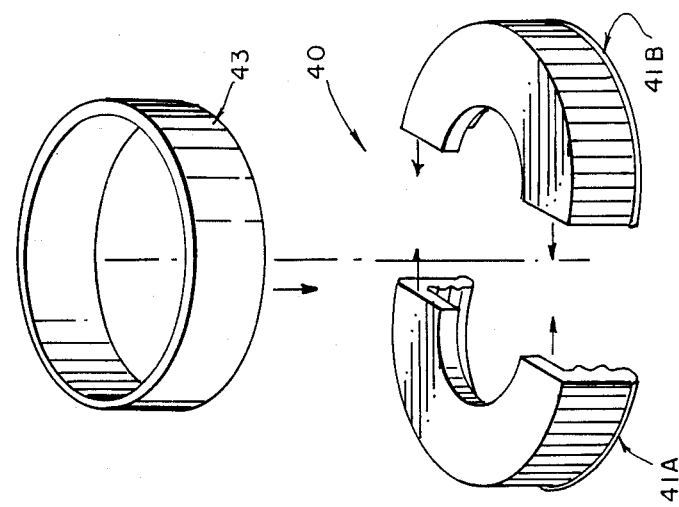
FIG. 7 is an exploded perspective view of the split nut and clamping ring used in the third form of the invention shown in FIG. 6.

A third form of the invention is indicated generally at 40 in FIGS. 6, 7 and 8. In this form of the invention, intended for use on large connections where it may be undesirable to use the flared end as shown at 21 in FIGS. 1-4, a split cap 41 is used. The split cap comprises two identical halves 41A and 41B, which are placed in the groove 22 in the tubing section 42, and a clamping ring 43 which is telescoped over the halves of the split cap to hold them assembled in the groove as shown in FIG. 8. With the exception of the elimination of the flared end 22 on the tubing section 42, and the use of the split cap 41, this form of the invention is identical to that illustrated and described in relation to FIGS. 1 and 2.

A fourth form of the invention is indicated generally at 50 in FIG. 9. In this form of the invention, intended for use in situations where size of the components and the pressures controlled are minimal, the cap 51 is formed of a slightly more resilient material to enable it to be forced over the flared end of the tubing section 11 and to then relax into the groove 22. The separate retaining ring 23 and its function are eliminated in this form of the invention. The cap itself, being engaged in the groove 22 in the tubing section, performs the functions performed by the retaining ring in FIGS. 1 and 2. In all other respects, this form of the invention is identical to that illustrated and described in relation to FIGS. 1 and 2.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

I claim:

1. A connector for tapered glass joints, comprising:
    a first section of glass tubing having a tapered, outwardly flared sealing surface formed on an inside surface of one end thereof, and threads formed on an outside surface of said end;
    a second section of glass tubing for connection to the first section, said second section having an end adapted to be inserted into said end of said first tubing section, and said end including a cylindrical portion with an outwardly flared terminal end defining a first retaining means;
    a replaceable, resilient sealing sleeve for concentric sealing engagement between said ends of the first and second sections of glass tubing when said end of the second section is inserted into said end of the first section in coaxial relationship with the sealing surface thereof, said sealing sleeve maintaining said first and second sections of glass tubing in spaced, non-contacting relationship with one another, said sleeve having a cylindrical inner surface for sliding engagement with the cylindrical portion of said second section of glass tubing, and a tapered outer surface for mating engagement with the tapered portion of the first section; and
    a cap having an internally threaded skirt for mating engagement with the threads on said end of the second tubing section and an end portion adapted to engage the sealing sleeve to force the sleeve into tight-fitting sealing engagement with the sealing surface in the first tubing section when the cap is tightened on the first tubing section, said outwardly flared terminal end of said second tubing section engaging said sealing sleeve to resist axial displacement of the second tubing section out of the first tubing section when the caP is tightened, and second retaining means engaged between the cap and the second tubing section to limit relative axial movement between the cap and said second tubing section for preventing the second tubing section from being displaced into said second tubing section.

2. A connector for tapered glass joints as claimed in claim 1, wherein:
    said second retaining means comprises a circumferential groove formed in an outer surface of said second tubing section in spaced relation to said end; and
    a retaining ring is received in said groove in position to engage against said cap to prevent axial displacement of the second tubing section into said first tubing section, said retaining ring and cap also being operative to function as a jack to separate said first and second tubing sections when the cap is unscrewed from the first tubing section and into abutting relationship with said retaining ring.

3. A connector for tapered glass joints as claimed in claim 2, wherein:
    said sealing sleeve has a radially outwardly directed flange on an outer end thereof for overlying engagement against the end of said first tubing section and adapted to be clamped between said end and said cap when the cap is tightened onto the first tubing section.

4. A connector for tapered glass joints as claimed in claim 3, wherein:
   an annular channel is formed in an outer circumferential portion of said flange, and an O-ring is received in said channel to form a seal with said first and second tubing sections.

5. A connector for tapered glass joints as claimed in claim 1, wherein:
   said second retaining means comprises a circumferential groove formed in an outer end surface portion of said second tubing section; and
   said cap is diametrically split to form two substantially identical halves adapted to be placed around said end of said second tubing section, said cap having an inner annular edge for reception in said groove to retain said cap against axial displacement relative to the second tubing section; and
   a clamping ring for placement around said halves of said cap to hold the halves assembled on said second tubing section end.

6. A connector for tapered glass joints as claimed in claim 1, wherein:
   said second retaining means comprises a circumferential groove is formed in an outer end surface portion of said second tubing section; and
   said cap has an inner annular edge for reception in said groove to retain said cap against axial displacement relative to the second tubing section.

* * * * *